(12) United States Patent
Sakaguchi et al.

(10) Patent No.: US 7,713,204 B2
(45) Date of Patent: May 11, 2010

(54) IMAGE DATA PROCESSING METHOD AND APPARATUS FOR ULTRASONIC DIAGNOSTIC APPARATUS, AND IMAGE PROCESSING APPARATUS

(75) Inventors: Fumiyasu Sakaguchi, Otawara (JP); Kenichi Ichioka, Nasu-Gun (JP)

(73) Assignees: Kabushiki Kaisha Toshiba, Tokyo (JP); Toshiba Medical Systems Corporation, Otawara-Shi (JP)

( * ) Notice: Subject to any disclaimer, the term of this patent is extended or adjusted under 35 U.S.C. 154(b) by 1402 days.

(21) Appl. No.: 11/032,036

(22) Filed: Jan. 11, 2005

(65) Prior Publication Data

US 2005/0215897 A1 Sep. 29, 2005

(30) Foreign Application Priority Data

Jan. 20, 2004 (JP) ............................. 2004-011808

(51) Int. Cl.
*A61B 8/00* (2006.01)
(52) U.S. Cl. ....................... 600/441; 600/443; 600/453
(58) Field of Classification Search ......... 382/128–132; 600/453
See application file for complete search history.

(56) References Cited

U.S. PATENT DOCUMENTS 5,409,007 A * 4/1995 Saunders et al. ............ 600/447
5,822,469 A * 10/1998 Silverstein ................... 382/267
5,838,378 A * 11/1998 Nakagawa et al. .......... 348/401
5,875,268 A * 2/1999 Miyake ....................... 382/276

FOREIGN PATENT DOCUMENTS

| JP | 10-165402 | 6/1998 |
|---|---|---|
| JP | 2000-262520 | 9/2000 |

* cited by examiner

*Primary Examiner*—Eric F Winakur
*Assistant Examiner*—Saurel J Selkin
(74) *Attorney, Agent, or Firm*—Oblon, Spivak, McClelland, Maier & Neustadt, L.L.P.

(57) ABSTRACT

An ultrasonic diagnostic system for reducing black holes and highlighting of turbulent mosaic patterns without degradation in spatial resolution in an ultrasonic color Doppler method. The system includes a unit configured to extract image data in a specified range with reference to a specified pixel of the image data to generate kernel data, a pixel-value arranging unit configured to modulate the values of the pixels in the kernel data, a pixel-value selecting unit configured to select a pixel value of a modulated pixel value in a specified array rank, a characteristic determination unit configured to determine the characteristic of the image from the pixel value of the first image data, and a second image-data generating unit configured to generate second image data based on the value of a specified pixel in the first image data, and the selected pixel value in the specified array rank, or the demodulated pixel value.

13 Claims, 12 Drawing Sheets

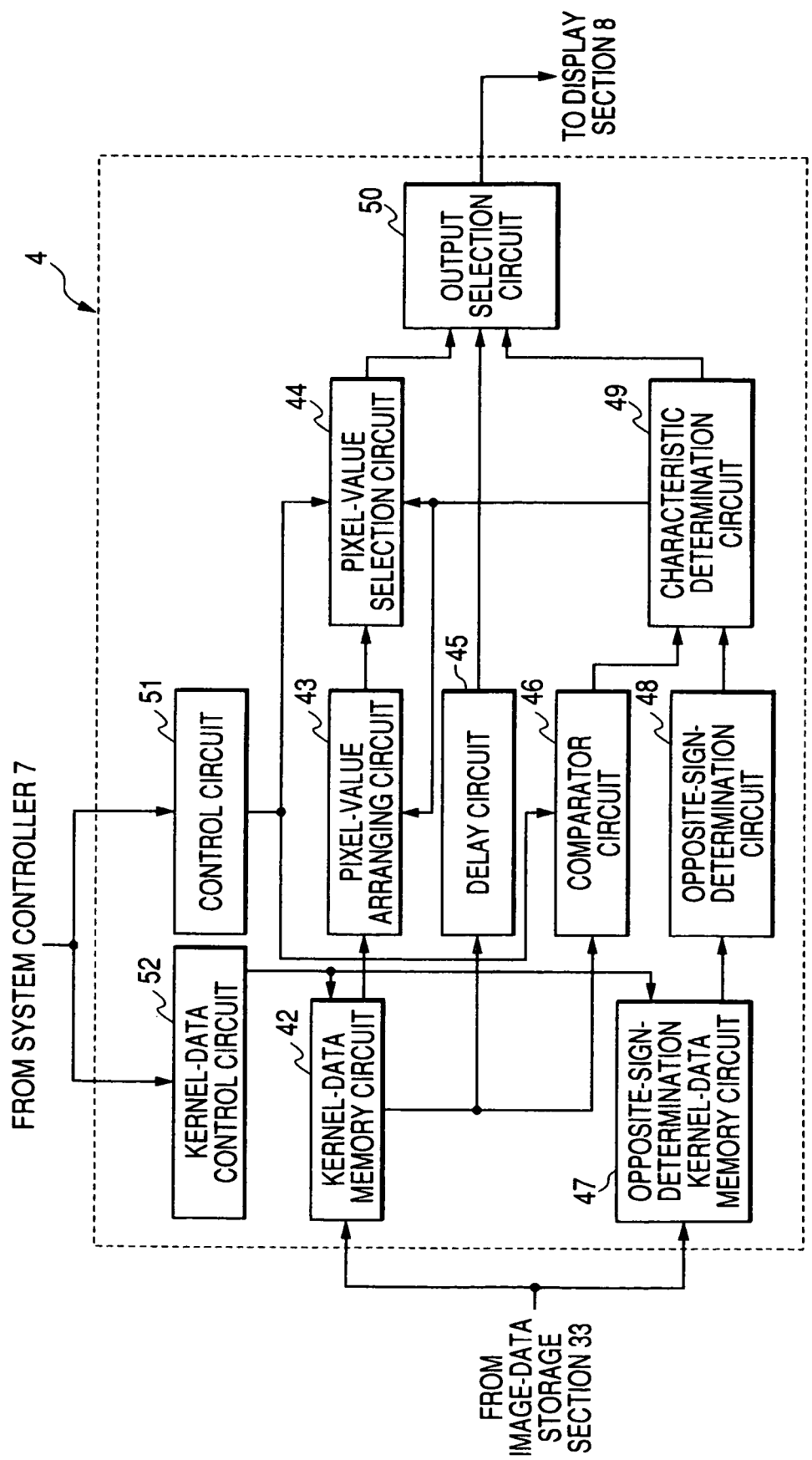

FIG. 4A

| a11 | a12 | a13 | a14 | a15 |
|---|---|---|---|---|
| a21 | a22 | a23 | a24 | a25 |
| a31 | a32 | a33 | a34 | a35 |
| a41 | a42 | a43 | a44 | a45 |
| a51 | a52 | a53 | a54 | a55 |
| a61 | a62 | a63 | a64 | a65 |
| a71 | a72 | a73 | a74 | a75 |
| a81 | a82 | a83 | a84 | a85 |
| a91 | a92 | a93 | a94 | a95 |
| aa1 | aa2 | aa3 | aa4 | aa5 |
| ab1 | ab2 | ab3 | ab4 | ab5 |
| ac1 | ac2 | ac3 | ac4 | ac5 |
| ad1 | ad2 | ad3 | ad4 | ad5 |
| ae1 | ae2 | ae3 | ae4 | ae5 |
| af1 | af2 | af3 | af4 | af5 |

FIG. 4B

| a32 | a33 | a34 |
|---|---|---|
| a42 | a43 | a44 |
| a52 | a53 | a54 |
| a62 | a63 | a64 |
| a72 | a73 | a74 |
| a82 | a83 | a84 |
| a92 | a93 | a94 |
| aa2 | aa3 | aa4 |
| ab2 | ab3 | ab4 |

FIG. 4C

| a62 | a63 | a64 |
|---|---|---|
| a72 | a73 | a74 |
| a82 | a83 | a84 |

RANK IN ARRAY "10"

FIG. 6

| GROUP | OPPOSITE-SIGN-DETERMINATION KERNEL-DATA CODE | COMPARISON WITH THRESHOLD | DETERMINATION OF BLOOD CHARACTERISTICS | METHOD FOR SELECTING PIXEL VALUE |
|---|---|---|---|---|
| A | SAME SIGN | BELOW THRESHOLD | LOW BLOOD-FLOW RATE IN THE MARGIN OF BLOOD VESSEL. HIGH SUSCEPTIBILITY TO NOISE. REQUIRING FILTERING TO DISPLAY MARGIN OR BLOOD-FLOW DISTRIBUTION SMOOTHLY. | OUTPUT PIXEL VALUE IN PREDETERMINED RANK SELECTED IN PIXEL-VALUE SELECTION CIRCUIT. |
| B | SAME SIGN | OVER THRESHOLD | HIGH BLOOD-FLOW RATE IN THE SAME DIRECTION. LOW SUSCEPTIBILITY TO NOISE. REQUIRING NO FILTERING. | OUTPUT PIXEL VALUE OF THE CENTRAL PIXEL OF KERNEL DATA. |
| C | OPPOSITE SIGN | BELOW THRESHOLD | LOW BLOOD-FLOW RATE IN THE MARGIN OF BLOOD VESSEL. HIGH SUSCEPTIBILITY TO NOISE. REQUIRING FILTERING TO DISPLAY MARGIN OR BLOOD-FLOW DISTRIBUTION SMOOTHLY. | OUTPUT PIXEL VALUE IN PREDETERMINED RANK SELECTED IN PIXEL-VALUE SELECTION CIRCUIT. |
| D | OPPOSITE SIGN | OVER THRESHOLD | HIGH BLOOD-FLOW RATE WITH TURNING-BACK OR BACKFLOW. LOW SUSCEPTIBILITY TO NOISE. REQUIRING PROCESS FOR EMPHASIZING TURNING-BACK OR BACKFLOW. | COMPARE ABSOLUTE VALUE OF PIXEL VALUE IN PREDETERMINED RANK IN PIXEL-VALUE SELECTION CIRCUIT WITH ABSOLUTE VALUE OF PIXEL VALUE OF CENTRAL PIXEL OF KERNEL DATA AND DISPLAY PIXEL VALUE HAVING LARGER ABSOLUTE VALUE. |

RANK IN ARRAY "14"
(INTERMEDIATE VALUE)

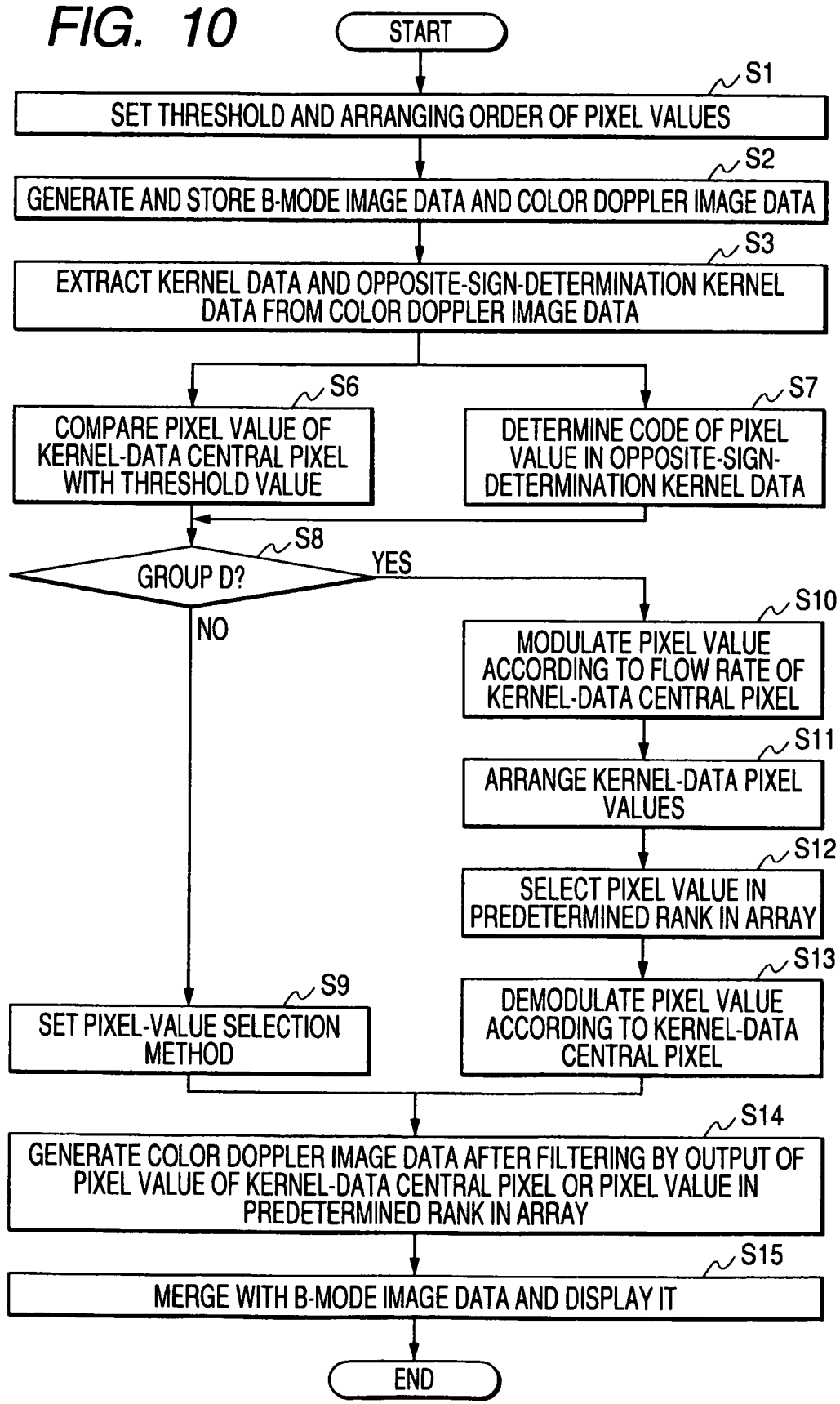

FIG. 12A

| -6  | 14  | -13 | -6  | 12  |
|-----|-----|-----|-----|-----|
| 11  | -15 | 12  | -9  | -15 |
| -14 | -13 | 15  | -14 | 14  |
| -6  | 12  | -15 | 3   | 0   |
| 15  | -6  | 5   | -14 | -14 |
| -16 | 12  | -14 | 12  | -5  |
| 14  | -13 | 13  | -6  | 12  |
| -14 | 5   | 0   | -15 | 13  |
| -16 | -15 | 13  | -6  | -16 |
| 15  | 0   | -16 | 13  | 14  |
| -13 | -9  | 15  | -13 | -15 |
| -6  | -12 | -13 | 11  | 13  |
| -10 | 0   | 13  | -5  | -9  |
| -10 | -6  | -5  | -6  | 15  |

| -13 | 15  | -14 |
|-----|-----|-----|
| 12  | -15 | 3   |
| -6  | 5   | -14 |
| 12  | -14 | 12  |
| -13 | 13  | -6  |
| 5   | -6  | -15 |
| -15 | 13  | -6  |
| -6  | -16 | 13  |
| -9  | 15  | -13 |

| -5  | -5  | -5  | -5  | -4  |
|-----|-----|-----|-----|-----|
| -5  | -5  | -5  | -6  | -4  |
| -6  | -6  | -5  | -6  | -5  |
| -6  | -6  | -5  | -5  | -5  |
| -7  | 4   | -6  | -5  | -5  |
| -7  | -7  | -6  | -6  | -4  |
| -8  | -7  | 13  | -6  | -5  |
| -8  | -7  | -7  | -16 | -4  |
| -9  | 0   | -7  | -6  | -5  |
| -9  | -8  | -7  | -6  | -5  |
| -10 | -8  | -8  | -7  | -6  |
| -10 | -9  | -8  | -7  | -6  |
| -11 | -9  | -8  | -7  | -5  |
| -12 | -9  | -9  | -8  | -6  |

| -6  | -5  | -6  |
|-----|-----|-----|
| -6  | -5  | -5  |
| -6  | -6  | -5  |
| -6  | -6  | -6  |
| -7  | -7  | -6  |
| -7  | -7  | -16 |
| -8  | -7  | -6  |
| -8  | -7  | -6  |
| -8  | -8  | -7  |

A10

IMAGE DATA PROCESSING METHOD AND APPARATUS FOR ULTRASONIC DIAGNOSTIC APPARATUS, AND IMAGE PROCESSING APPARATUS

BACKGROUND OF THE INVENTION

1. Field of the Invention

The present invention relates to an ultrasonic diagnostic system for imaging according to an ultrasonic Doppler signal obtained from a subject and a method of processing ultrasonic image data.

2. Description of the Related Art

Ultrasonic diagnostic systems radiate ultrasonic pulses generated from piezoelectric vibrators incorporated in an ultrasonic probe into a subject, receive reflected ultrasonic waves generated by the difference in acoustic impedance of the tissue of the subject with the piezoelectric vibrators, and display it on a monitor. The diagnostic technique is widely used for diagnosing the functions and shapes of the various organs of living bodies, because it allows easy observation of a real-time two-dimensional image by a simple operation of bringing the ultrasonic probe into contact with the surface of the body.

The ultrasonic diagnostic technique of acquiring living-body information from the tissues of living bodies or reflected waves from blood cells has made a remarkable progress owing to two great technological developments, an ultrasonic pulse reflection method and an ultrasonic Doppler method; a B-mode image and a color Doppler image obtained by using the above techniques are absolutely essential in the present ultrasonic diagnostic imaging.

The color Doppler method is a method whereby a specified cross section of a living body is scanned with ultrasonic pulses, wherein when a moving reflector such as blood (blood cells) is irradiated with the ultrasonic waves, a Doppler frequency shift generated in correspondence with the velocity of the reflector (blood flow rate) is imaged. The color Doppler method was at first used to image the high blood flow in a cardinal cavity, but today it has been applicable to imaging of extremely low blood flow such as the blood flow of the tissues of abdominal organs.

In order to enhance the diagnostic ability of the color Doppler method, it is necessary to have, firstly, high measuring accuracy (particularly, low-flow-rate detectability), secondly, time resolution (real-time characteristic), and thirdly, spatial resolution.

When ultrasonic pulses are radiated to a moving reflector to measure the velocity of the reflector from the Doppler frequency shift of reflected waves, it is necessary to repeat transmission and reception of ultrasonic waves to/from the reflector multiple times (L times) at a rate interval Tr, thereby measuring the moving speed of the reflector from a series of acquired reflected waves. In this case, the detectability (measuring range lower limit of a flow rate) Vmin of a low-speed reflector depends on the frequency resolution $\Delta fd$ of frequency analysis for a series of reflected waves acquired by the n times of ultrasonic transmission and reception. The frequency resolution $\Delta fd$ is expressed as equation (1)

$$\Delta fd = fr/L \qquad (1)$$

where fr (fr=1/Tr) is an ultrasonic transmission reception repetition frequency (rate frequency).

In other words, in order to increase the low-flow-rate detectability, the first requirement in the color Doppler method, it is necessary to delay the rate frequency fr or increase the ultrasonic transmission and reception repetition times L in a predetermined direction.

The real-time characteristic, the second requirement, is determined depending on the number of display images (frame frequency) Fn per unit time. The frame frequency Fn is expressed as equation (2)

$$Fn = fr/L/M = \Delta fd/M \qquad (2)$$

where M is the total number of scanning lines (raster) necessary to construct one piece of color Doppler image data. In order to improve the real-time characteristic, the transmission and reception number L or the total number M of scanning lines must be set small.

In order to enhance the spatial resolution, the third requirement, it is necessary to increase the total number M of scanning lines. Since the frame frequency Fn, the detectability Vmin, and the spatial resolution are mutually contradictory and so it is difficult to satisfy them at the same time. Accordingly, for measuring blood flow in a circulatory region, the frame frequency has been regarded as important and, for measuring blood flow in an abdominal region and peripheral regions, low-flow-rate detectability has been regarded as important, in both of which the spatial resolution has been disregarded.

For the decline in spatial resolution, temporal or spatial filtering is performed by using a low-pass filter or a median filter (median extraction filter) to smooth the boundary of blood vessels or blood-flow distribution or to reduce image defect (so-called a black hole pattern) due to the interference of ultrasonic waves etc. However, the application of the conventional filtering method makes it difficult to display the boundary of a blood flow pattern with the smoothing of the boundary and the decrease of the black hole pattern, resulting in a decrease in diagnostic ability.

To overcome the above problems, for example, JP-A-2000-262520 proposes a median filter that has the function of determining whether the value of a specified pixel (target pixel) on color Doppler image data is a singular value such as black hole. In this method, the difference between the value of a specified pixel (target pixel) of Doppler image data and the value of its peripheral pixel (reference pixel) is calculated, wherein when the difference is smaller than a predetermined threshold value, the value of the reference pixel is replaced with the value of the target pixel, then the median value is extracted from the values of the reference pixel and the target pixel, and the median value is substituted by the value of the target pixel.

Although the above method allows a black hole pattern to be decreased without reducing spatial resolution, it is difficult to display a mosaic pattern caused by a turbulent flow or a backward flow generated in a narrow part of a blood vessel (hereinafter, referred to as a turbulent mosaic pattern).

Blood flows at a high rate in a narrow part of a blood vessel to generate a turbulent flow, so that a blood flow moving close to the ultrasonic probe and a blood flow moving away from the probe are mixed. Moreover, at the high blood flow rate, the Doppler frequency exceeds a Nyquist frequency determined by a sampling frequency to generate a turning back phenomenon.

Although the turbulent mosaic pattern generated by those phenomena is very important information for an ultrasonic diagnosis of a narrow part, the foregoing method determines the pixels in the turbulent mosaic pattern to be singular points, so that the clearness or brightness of the image is decreased, thus making it difficult to observe.

Furthermore, when the reference pixel and the target pixel are composed of plus pixel values and minus pixel values of approximately the same number as the plus pixel values, the median value approaches zero, and so the turbulent mosaic pattern cannot be displayed.

SUMMARY OF THE INVENTION

The present invention has been made in consideration of the problems of the conventional systems. Accordingly, it is an object of the invention to provide an ultrasonic diagnostic system capable of reducing black hole patterns and highlighting turbulent mosaic patterns without degradation in spatial resolution in an ultrasonic color Doppler method, and a method of processing ultrasonic image data.

In order to achieve the above object, according to a first aspect of the invention, in filtering color Doppler image data (first image data) obtained by transmitting and receiving ultrasonic waves to/from a subject, the color Doppler image data in a specified range set with reference to a specified pixel (for example, in the center) of the color Doppler image data is extracted to generate kernel data, and then a pixel value in a predetermined rank is selected from the pixel values in the kernel data which are arranged in descending order.

According to a second aspect of the invention, the image data characteristic for the color Doppler image data is determined, and one of the value of the specified pixel in the color Doppler image data and the pixel value in the specified array rank is selected from the determination to generate filtered color Doppler image data (second image data).

According to a third aspect, the invention has the function of modulating and demodulating the value of a specified pixel in the color Doppler image data to highlight a turbulent mosaic pattern and a turning-back pattern which are clinically useful, when the flow-rate image data is composed of pixel values of plus flow rate and pixel values of minus flow rate in mosaic pattern.

Specifically, the ultrasonic diagnostic system according to the invention comprises an ultrasonic probe including piezoelectric vibrators for transmitting and receiving ultrasonic waves to/from a subject, a transmitting and receiving section for transmission and reception to/from the piezoelectric vibrators, a first image-data generating section for generating first image data from a received signal obtained by the transmitting and receiving section, a kernel-data generating section for extracting the first image data in a specified range set with reference to a specified pixel of the first image data to generate kernel data, a pixel-value arranging section for modulating the values of the pixels in the kernel data if necessary and arranging the pixel values or the obtained modulated pixel values in descending order, a pixel-value selecting section for either selecting a pixel value in a specified array rank from the arranged multiple pixel values or selecting a modulated pixel value in a specified array rank from the modulated pixel values and demodulating the selected modulated pixel value, a characteristic determination section for determining the characteristic of the image from the pixel value of the first image data, and a second image-data generating section for selecting one of the value of a specified pixel in the first image data and the pixel value in the specified array rank selected by the pixel-value selecting section or the demodulated pixel value on the basis of determination of the characteristic determination section to generate second image data.

The modulation means offset process for offsetting the pixel values in the kernel data by an amount to bring the Q component of the value of the central pixel to zero. The demodulation means subtraction of the offset.

A method of processing ultrasonic image data according to the invention comprises the step of transmitting or receiving ultrasonic waves to/from a subject to generate first image data from obtained received signal, the step of extracting the first image data in a specified range set with reference to a specified pixel in the first image data to generate kernel data, the step of modulating the values of the pixels in the kernel data according to the value of the specified pixel in the first image data if necessary, the step of arranging the pixel values or the modulated pixel values in descending order, the step of selecting a pixel value in a specified array rank from the arranged multiple pixel values or modulated pixel values, the step of demodulating the selected pixel value according to the value of the specified pixel in the first image data if necessary, the step of determining the image characteristic from the pixel value in the first image data, and the step of selecting one of the value of the specified pixel in the first image data and the pixel value in the specified array rank or the demodulated pixel value selected by the pixel selecting section to generate the second image data.

According to the invention, there is provided an image processing system for performing image filtering process of obtaining the value of a specified pixel in image data including flow-rate information from the values of multiple pixels in a specified range. The system comprises a pixel-value selecting section for determining the pixel value according to the order of the values of the pixels in the specified range, a first determination section for determining whether or not the flow directions of the values of the multiple pixels in the specified range are the same, a second determination section for determining whether or not the value obtained from the values of the multiple pixels in the specified range exceeds a predetermined threshold value, and an output section for obtaining a pixel value from the outputs of the pixel-value selecting section, the first determination section, and the second determination section.

The invention allows reduction of black hole patterns and highlighting of turbulent mosaic patterns without degradation in spatial resolution in an ultrasonic color Doppler method.

BRIEF DESCRIPTION OF THE DRAWINGS

FIG. 3 is a block diagram of an image-data processing section according to the embodiment;

FIG. 4A is a diagram of an example of flow-rate image data, FIG. 4B is a diagram of an example of kernel data, and FIG. 4C is a diagram of an example of opposite-sign determination kernel data;

FIGS. 5A and 5B are diagrams showing the functions of a pixel-value array circuit and a pixel-value selecting circuit, wherein FIG. 5A shows an example of kernel data and FIG. 5B shows an array of the kernel data arranged in descending order, from which a pixel value in a specified place is selected;

FIG. 6 is a diagram of a concrete example of a method of determining blood-flow characteristics by a characteristic determination circuit and a pixel-value selection method;

FIGS. 8A to 8C are diagrams for describing the effects of the image-data processing according to the embodiment, wherein FIG. 8A shows extraction of kernel data, FIG. 8B shows the array of the kernel data, and FIG. 8C shows flow-rate image data after filtering;

FIGS. 9A to 9C are diagrams for describing other effects of image-data processing according to the embodiment, wherein FIG. 9A shows extraction of kernel data, FIG. 9B shows the array of the kernel data, and FIG. 9C shows flow-rate image data after filtering;

FIG. 10 is a flowchart for an image-data processing procedure according to a modification of the embodiment;

FIGS. 12A and 12B are diagrams for describing the effects of image-data processing according to the modification of the embodiment, wherein FIG. 12A shows an example of flow-rate image data and FIG. 12B shows flow-rate data of the modification after filtering; and FIGS. 13A and 13B are diagrams showing other effects of image-data processing of the modification, wherein FIG. 13A shows an example of flow-rate image data and FIG. 13B shows flow-rate data of the modification after filtering.

DESCRIPTION OF THE PREFERRED EMBODIMENTS

Referring to FIGS. 1 to 9, an embodiment of the present invention will be described below.

(Structure of the System)

Figure 1:
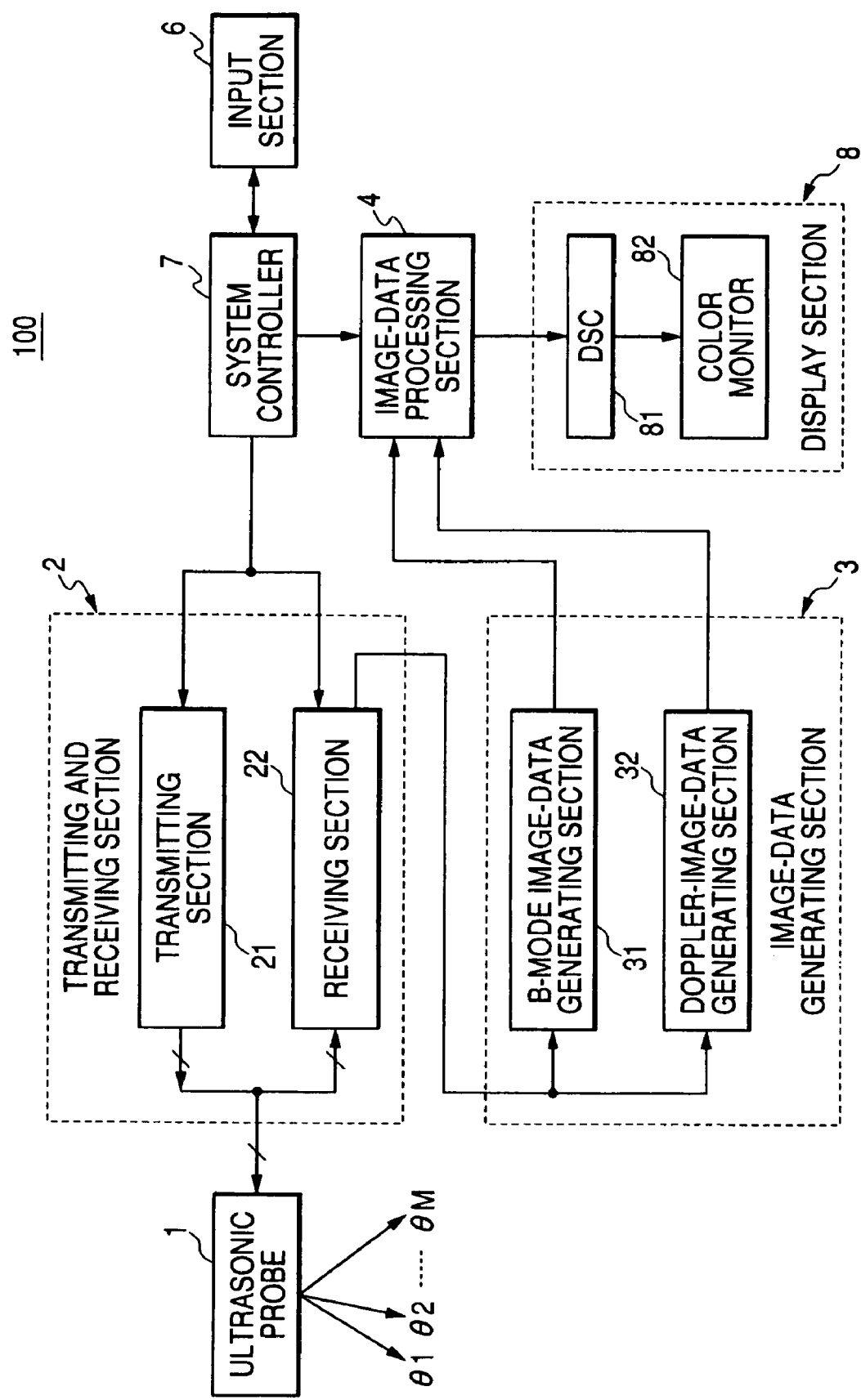
FIG. 1 is a block diagram showing the overall structure of an ultrasonic diagnostic system according to an embodiment of the present invention.
Figure 2:
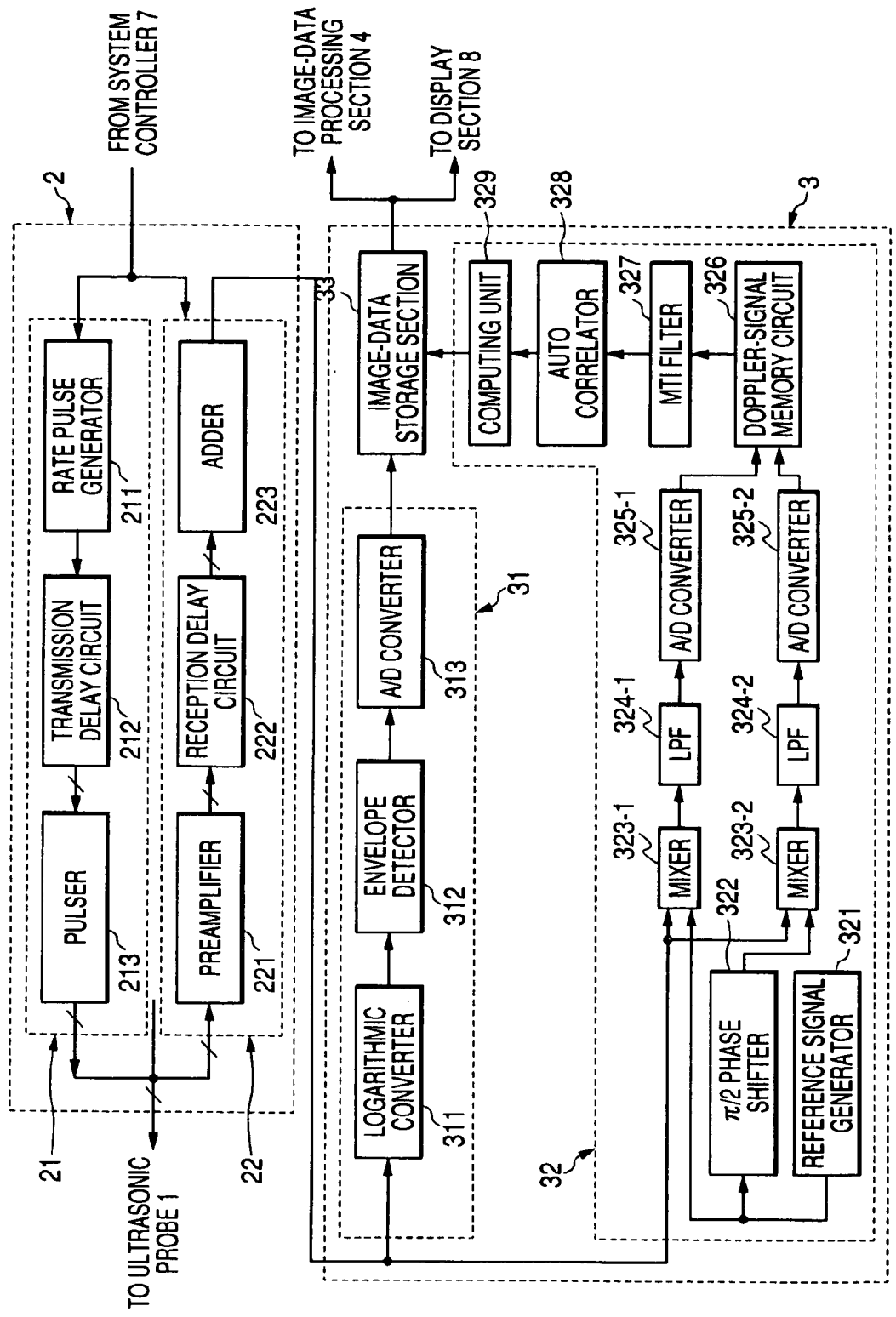
FIG. 2 is a block diagram showing the structure of a receiving and transmitting section and an image-data generating section according to the embodiment.

The structure of an ultrasonic diagnostic system according to an embodiment of the present invention will be described hereinbelow with reference to FIGS. 1 to 6. FIG. 1 is a block diagram showing the overall structure of the ultrasonic diagnostic system according to the embodiment. FIG. 2 is a block diagram of a receiving and transmitting section and an image-data generating section that make up the ultrasonic diagnostic system.

An ultrasonic diagnostic system 100 shown in FIG. 1 includes an ultrasonic probe 1 for transmitting and receiving ultrasonic waves to/from a subject, a transmitting and receiving section 2 for transmitting and receiving electric signals to/from the ultrasonic probe 1 to transmit and receive ultrasonic waves in a predetermined scanning direction, an image-data generating section 3 for generating ultrasonic image data according to a received ultrasonic signal obtained from a predetermined scanning direction, and an image-data processing section 4 for filtering the ultrasonic image data generated by the image-data generating section 3.

The ultrasonic diagnostic system 100 further includes a display section 8 for displaying the ultrasonic image data filtered in the image-data processing section 4, an input section 6 for inputting ultrasonic-image-data collecting conditions, image-data processing conditions, and various command signals, and a system controller 7 for controlling over the above units.

The ultrasonic probe 1 transmits and receives ultrasonic waves by bringing its front face into contact with the surface of a subject and has, for example, multiple (N) piezoelectric vibrators arranged in one dimension at the end. The piezoelectric vibrator is an electroacoustic transducer, which has the function of converting electric pulses (driving signals) to ultrasonic pulses (transmission ultrasonic waves) at the time of transmission, and converts reflected ultrasonic waves (received ultrasonic waves) to electric signals (received signals) at the time of reception. The ultrasonic probe 1 is compact and lightweight and is connected to the transmitting and receiving section 2 via an N-channel cable. The ultrasonic probe 1 is divided into sector scanning, linear scanning, convex scanning probes, etc., and any one of which is selected depending on the diagnostic region. Here an ultrasonic probe 1 for sector scan will be described, but an ultrasonic probe for another scan, such as convex scan, can be used.

The transmitting and receiving section 2 shown in FIG. 2 includes a transmitting section 21 that generates a driving signal for generating transmission ultrasonic waves from the ultrasonic probe 1 and a receiving section 22 that performs phasing addition to multiple-channel received signals obtained from the piezoelectric vibrators of the ultrasonic probe 1. The image-data generating section 3 include a B-mode image-data generating section 31 that processes the phasing-added received signals to generate B-mode image data and a Doppler-image-data generating section 32 that detects an IQ signal from the phasing-added received signal and generates color Doppler image data on the basis of the IQ signal.

The transmitting section 21 of the transmitting and receiving section 2 includes a rate pulse generator 211, a transmission delay circuit 212, and a pulser 213. The rate pulse generator 211 sends rate pulses to determine the repetition period (Tr) of ultrasonic pulses applied to a subject to the transmission delay circuit 212.

The transmission delay circuit 212 is composed of separate delay circuits of the same number (N channels) as that of the piezoelectric vibrators used for transmission in the ultrasonic probe 1. The transmission delay circuit 212 provides concentrating delay time for concentrating ultrasonic waves into a specified depth to obtain a narrow beam width in transmission and deflecting delay time for transmitting ultrasonic waves in a specified direction to the rate pulses and sends the rate pulses to the pulser 213.

The pulser 213 has separate driving circuits of the same number (N channels) as that of the piezoelectric vibrators used for transmission. The pulser 213 drives N piezoelectric vibrators incorporated in the ultrasonic probe 1 to generate driving pulses for radiating transmission ultrasonic waves to a subject.

The receiving section 22 includes an N-channel preamplifier 221, a reception delay circuit 222, and an adder 223. The preamplifier 221 amplifies the minute reception signals converted to electric signals by the piezoelectric vibrators to ensure sufficient S/N. The reception delay circuit 222 provides concentrating delay time for concentrating received ultrasonic waves from a specified depth to obtain a narrow beam width and deflecting delay time for setting the receiving direction of ultrasonic beams in a specified direction to the output of the preamplifier 221 and sends them to the adder 223. The N-channel received signals from the reception delay circuit 222 are added by the adder 223.

The image-data generating section 3 includes a B-mode image-data generating section 31, a Doppler-image-data generating section 32, and an image-data storage section 33. The B-mode image-data generating section 31 includes a logarithmic converter 311, an envelope detector 312, and an A/D converter 313. The amplitude of the input signal of the B-mode image-data generating section 31 is logarithmically converted by the logarithmic converter 311 so that a weak signal is enhanced relatively. The envelope detector 312 detects an envelope of the logarithmically converted received signals to remove ultrasonic frequency components. The A/D converter 313 converts the output signals of the envelope detector 312 from analog to digital to generate B-mode image data.

The Doppler-image-data generating section 32 includes a reference signal generator 321, a π/2 phase shifter 322, mixers 323-1 and 323-2, low-pass filters (LPF) 324-1 and 324-2, A/D converters 325-1 and 325-2, and a Doppler-signal memory circuit 326 and detects the quadrature-phase of the ultrasonic received signals to detect an IQ signal.

More specifically, the signals inputted to the Doppler-image-data generating section 32 from the receiving section 22 are inputted to first input terminals of the mixers 323-1 and 323-2. The continuous wave outputted from the reference signal generator 321 having a frequency almost equal to the center frequency of the input signal and synchronized with the rate pulses of the rate pulse generator 211 is sent directly to a second input terminal of the mixer 323-1 and is shifted in phase by 90 degrees by the π/2 phase shifter 322 and sent to a second input terminal of the mixer 323-2. The outputs of the mixers 323-1 and 323-2 are sent to the LPFs 324-1 and 324-2, where only the component of the difference between the frequency of the output signal of the receiving section 22 and that of the reference signal generator 321 is detected.

The A/D converters 325-1 and 325-2 sample the output signals of the LPFs 324-1 and 324-2, or the analog signals subjected to quadrature detection in a specified sampling period, then convert them to digital signals, and store them in the Doppler-signal memory circuit 326.

In this case, the Doppler-image-data generating section 32 detects the quadrature-phase of the received signals obtained by continuous multiple times (L times) of ultrasonic transmission and reception in a specified scanning direction. I components (the real parts of the Doppler signal) and Q components (the imaginary parts of the Doppler signal) obtained by the quadrature detection are stored in the Doppler-signal memory circuit 326 in sequence.

The Doppler-image-data generating section 32 includes an MTI filter 327 for generating color Doppler image data from the obtained IQ signals, an autocorrelator 328, and a computing unit 329. The Doppler-image-data generating section 32 analyses the frequency by using L IQ signals stored in the Doppler-signal memory circuit 326 and continuing in the temporal direction at the same position (depth) in the same scanning direction and generates color Doppler image data on the basis of the analysis.

The MTI filter 327 is a high-pass digital filter and removes a Doppler signal component (clutter signal component) caused by the respiratory movement or pulsating movement of organs from the IQ signals temporarily stored in the Doppler-signal memory circuit 326.

The autocorrelator 328 performs autocorrelation of the Doppler signals of which only blood-flow information is extracted by the MTI filter 327. The computing unit 329 calculates the mean flow rate, the variance, and the power in two dimensions from the autocorrelation to generate color Doppler image data.

The image-data storage section 33 stores the B-mode image data outputted from the A/D converter 313 of the B-mode image-data generating section 31 and the two-dimensional color Doppler image data on the mean flow-rate, the variance, and the power of blood-flow, which is generated by the computing unit 329 of the Doppler-image-data generating section 32. The color Doppler image data will be hereinafter referred to as velocity image data, variance image data, and power image data, and particularly, will be described with reference to the filtering of the velocity image data, but may be described for the variance image data or the power image data.

The structure of the image-data processing section 4 that is the principal unit of the embodiment will be described with reference to the block diagram of FIG. 3. The image-data processing section 4 shown in FIG. 3 includes a kernel-data memory circuit 42 and an opposite-sign-determination kernel-data memory circuit 47 for storing flow-rate image data extracted from a specified region around a specified pixel (hereinafter, referred to as a central pixel) of the flow-rate image data stored in the image-data storage section 33 of FIG. 2, a pixel-value arranging circuit 43 for arranging the flow-rate image data (hereinafter, referred to as kernel data) stored in the kernel-data memory circuit 42 in descending order of a pixel value, and a pixel-value selection circuit 44 for selecting a pixel value in a specified rank from the arranged pixel vales.

The image-data processing section 4 further includes a comparator circuit 46 for comparing the value of the central pixel in the kernel data with a predetermined threshold value, an opposite-sign determination circuit 48 for determining whether the pixel value of the flow-rate image data (hereinafter, referred to as opposite-sign determination kernel data) stored in the opposite-sign-determination kernel-data memory circuit 47 is the same sign or the opposite sign, a characteristic determination circuit 49 for determining the characteristics of the image data from the comparison result of the comparator circuit 46 and the determination of the opposite-sign determination circuit 48, an output selection circuit 50 for selecting one of the pixel value in a specified rank which is outputted from the pixel-value selection circuit 44 on the basis of the information outputted from the characteristic determination circuit 49 and the value of the central pixel of the kernel data in the kernel-data memory circuit 42 and outputting it, a control circuit 51 for controlling the above units, and a kernel-data control circuit 52.

Referring to FIGS. 4A to 4C, the kernel data stored in the kernel-data memory circuit 42 and the opposite-sign determination kernel data stored in the opposite-sign-determination kernel-data memory circuit 47 will be described below. FIG. 4A shows the pixel address of flow-rate image data stored in the image-data storage section 33. The mean flow rate calculated by the computing unit 329 of the Doppler-image-data generating section 32 is stored, e.g. by 5 bits (−16 to +15) in the image-data storage section 33. Here, the following description will be given with reference to flow-rate image data A1 composed of 15 pixels in the direction of ultrasonic transmission and reception and 5 pixels in the scanning direction perpendicular to the direction of transmission and reception, for the convenience of description.

FIG. 4B shows kernel data A2 stored in the kernel-data memory circuit 42; and FIG. 4C shows opposite-sign determination kernel data A3 stored in the opposite-sign-determination kernel-data memory circuit 47. The kernel data A2 and the opposite-sign determination kernel data A3 are extracted from the flow-rate image data in the image-data storage section 33. For example, when a pixel a73 in the flow-rate image data A1 is filtered, the kernel data A2 (see FIG. 4B) of 3×9 pixels (27 pixels) surrounded by pixels a32, a34, ab2, and ab4 with the pixel a73 as the center is extracted from the flow-rate image data A1 in the image-data storage section 33 and stored in the kernel-data memory circuit 42. Similarly, opposite-sign determination kernel data A3 (see FIG. 4C) of 3×3 pixels (9 pixels) surrounded by pixels a62, a64, a82, and a84 is stored in the opposite-sign-determination kernel-data memory circuit 47. It is desirable to set the number of pixels in the opposite-sign determination kernel data A3 smaller than that of kernel data A2 to prevent noise or the influence of the Doppler signals (clutter signals) caused by the movement of living tissues.

Figures 5A, 5B:

Referring to FIGS. 5A and 5B, the pixel-value arranging circuit 43 and the pixel-value selection circuit 44 will be described. FIG. 5A shows the values (flow rates) of the pixels in the kernel data A2, schematically showing the flow rate of blood flowing close to the ultrasonic probe 1 as +6 to +8, and the flow rate of a living tissue having no blood flow as 0.

The pixel-value arranging circuit 43 reads the kernel data A2 stored in the kernel-data memory circuit 42 and rearranges the pixel values in descending order, as shown in FIG. 5B. More specifically, the order from pixel value "8" to pixel value "0" is set in the pixel-value arranging circuit 43. The pixel-value selection circuit 44 selects a pixel value in a predetermined rank (here, the tenth pixel value "6") from the multiple pixel values arranged in descending order by the pixel-value arranging circuit 43. The pixel value "6" is temporarily set as the value of the pixel a73 after filtering.

The comparator circuit 46 compares the value of the central pixel a73 in the kernel data A2 with a predetermined threshold value and outputs a signal corresponding to "below the threshold value" or "over the threshold value."

The opposite-sign determination circuit 48 reads the opposite-sign determination kernel data A3 of 3×3 pixels which is stored in the opposite-sign-determination kernel-data memory circuit 47 and compares the signs of the pixels. When all the pixel values are plus or minus values, it outputs a signal corresponding to "the same sign"; when plus values and minus values are mixed, it outputs a signal corresponding to "the opposite sign."

The characteristic determination circuit 49 determines the blood characteristics of the flow-rate image data A1 from the comparison on "below the threshold value" or "over the threshold value" sent form the comparator circuit 46 and the determination on "the same sign" or "the opposite sign" sent from the opposite-sign determination circuit 48 and sets a pixel-value selection method suitable for the blood-flow characteristics.

For example, the characteristic determination circuit 49 has a lookup table in which the contents of FIG. 6 are stored, and sets a pixel-value selection method depending on the blood characteristics of the flow-rate image data A1 which are determined from sign-determination information sent from the opposite-sign determination circuit 48 and threshold-value comparison information sent from the comparator circuit 46.

Referring to FIG. 6, a concrete example of a method of determining blood-flow characteristics in the flow-rate image data and a pixel-value selection method will be described. As shown in groups "A" and "C" of FIG. 6, when the value of the central pixel in the kernel data A2 is smaller than the predetermined threshold value (or equal to or smaller than the threshold value), the blood-flow information of the central pixel indicates a low blood-flow rate in the margin of a blood vessel and so on, irrespective of the sign of the opposite-sign determination kernel data A3, in which case it is susceptible to system noise or a clutter signal (clutter noise), so that it is difficult to display the boundary with the margin of a blood vessel or blood-flow distribution smoothly. In this case, the characteristic determination circuit 49 generates a pixel-value selection control signal for outputting the pixel value that is temporarily set in the pixel-value selection circuit 44 from the output selection circuit 50.

As shown in group "B" of FIG. 6, when the value of the central pixel in the kernel data A2 is larger than the threshold value (or equal to or larger than the threshold value) and the signs of the opposite-sign determination kernel data A3 are the same sign, the blood-flow information of the central pixel indicates a high-rate blood flow in the same direction, in which case it is insusceptible to noise, so that it requires no filtering. In this case, the characteristic determination circuit 49 generates a pixel-value selection control signal for outputting the value of the central pixel in the kernel data A2 from the output selection circuit 50.

As shown in group "D" of FIG. 6, when the value of the central pixel in the kernel data A2 is larger than the threshold value (or equal to or larger than the threshold value) and the signs of the opposite-sign determination kernel data A3 are opposite signs, the blood-flow information of the central pixel indicates a high-rate blood flow with a turn-back phenomenon or a backward flow mixed, in which case it is insusceptible to noise. In this case, the characteristic determination circuit 49 performs a process for highlighting the turning-back and backflow phenomena still further. More specifically, the pixel-value selection circuit 44 compares the absolute value of the pixel value temporarily set in the pixel-value selection circuit 44 with the absolute value of the value of the central pixel in the kernel data A2, selects a pixel value having a larger absolute value, and generates a pixel-value selection control signal to be outputted from the output selection circuit 50.

The output selection circuit 50 selects one of the pixel value in a specified rank which is temporarily set by the pixel-value selection circuit 44 and the value of the central pixel in the kernel data A2 on the basis of the pixel-value selection control signal generated by the characteristic determination circuit 49, and outputs it. In this case, when the pixel-value arranging circuit 43 and the pixel-value selection circuit 44 do not operate at a sufficiently high speed, it is desirable to provide a timing adjusting delay circuit 45 between the kernel-data memory circuit 42 and the output selection circuit 50.

The control circuit 51 shown in FIG. 3 includes a CPU and a memory circuit, and controls the units in the image-data processing section 4. Particularly, the control circuit 51 provides information on the threshold value of the pixel values which is stored in the memory circuit to the comparator circuit 46 and information on the order of the pixel values to the pixel-value selection circuit 44.

The kernel-data control circuit 52 provides information on the number of pixels (for example, 3×9 pixels) in the kernel data A2 to the kernel-data memory circuit 42 and information on the number of pixels (for example, 3×3 pixels) in the opposite-sign determination kernel data to the opposite-sign-determination kernel-data memory circuit 47.

Referring back to FIG. 1, the display section 8 includes a digital scan converter (DSC) 81 and a color monitor 82, which displays a combination of filtered flow-rate image data sent from the output selection circuit 50 of the image-data processing section 4 and B-mode image data sent from the image-data storage section 33.

Specifically, the DSC 81 includes a CPU and a memory circuit (not shown). The B-mode image data directly outputted from the image-data storage section 33 is temporarily stored in the B-mode image data memory region of the DSC 81, while the filtered flow-rate image data collected at almost the same time as the B-mode image data and outputted from the output selection circuit 50 is temporarily stored in the color-Doppler-image-data memory region of the DSC 81. Furthermore, the DSC 81 combines the flow-rate image data and the B-mode image data to generate display image data. The color monitor 82 displays the display image data generated by the DSC 81.

In that case, the DSC 81 generates one piece of display image data in which the flow-rate image data is superimposed on the B-mode image data serving as a background image; the color monitor 82 displays the flow-rate image data in color with the monochrome B-mode image data as a background.

The input section 6 includes input devices, such as a keyboard, a trackball, and a mouse, and a display panel on an input panel, through which patient information, a diagnostic region, an image-data collection mode, an image-data processing method, an image-data display method, and various command signals are inputted. The input section 6 is also used to set the number of pixels in the kernel-data memory circuit 42 and the opposite-sign-determination kernel-data memory circuit 47, the threshold in the comparator circuit 46, and the order of arrangement in the pixel-value selection circuit 44.

The system controller 7 includes a CPU and a memory circuit (not shown) and generally controls the units in the ultrasonic diagnostic system 100 and the overall system. Particularly, the system controller 7 temporarily stores information on the numbers of pixels in the kernel data A2 and the opposite-sign determination kernel data A3, which are set by the input section 6, the threshold value in the comparator circuit 46, and the arrangement order in the pixel-value selection circuit 44 in the memory circuit and then provides the information to the corresponding units.

(Processing Procedure of Image Data)

Figure 7:
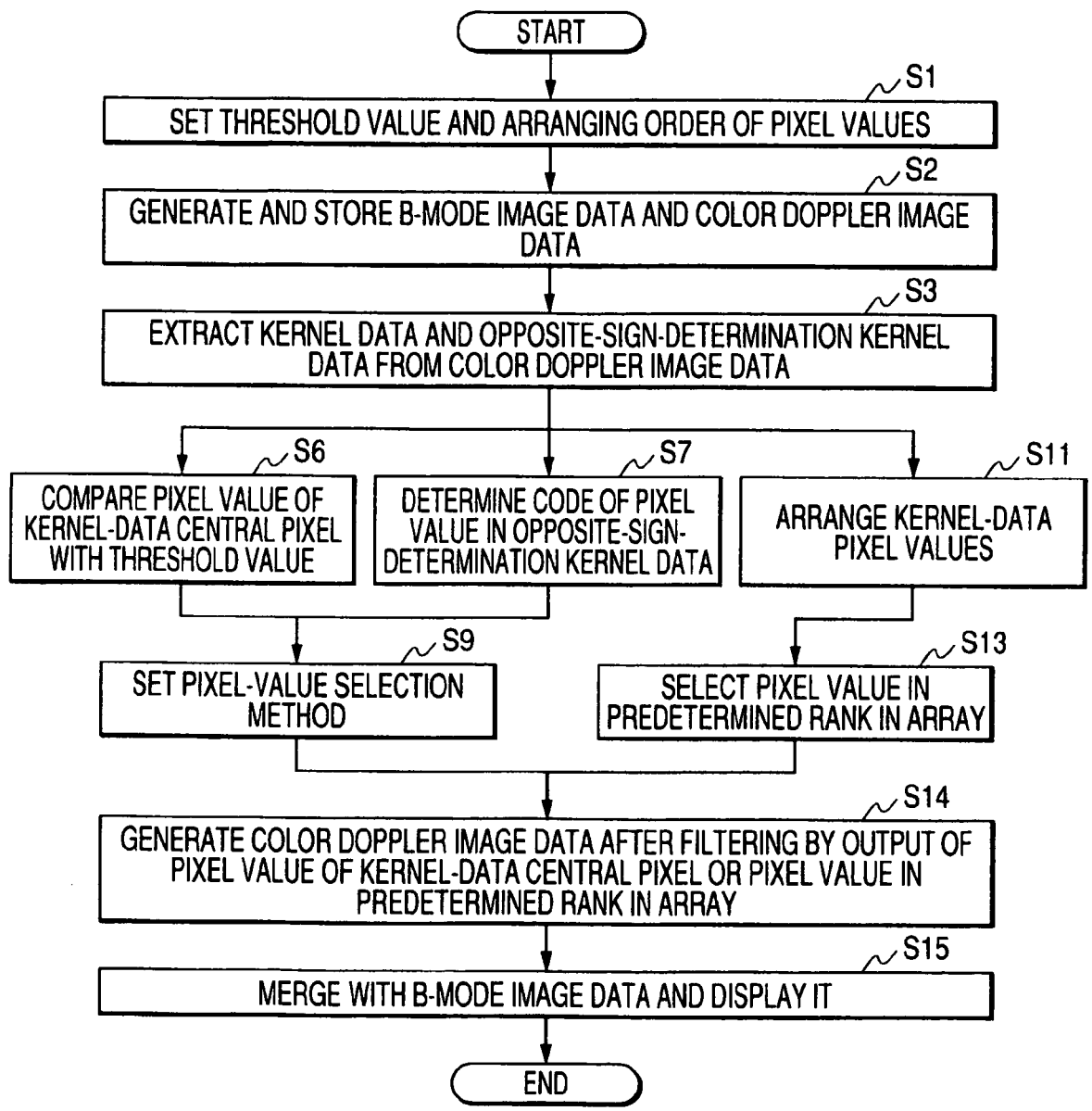
FIG. 7 is a flowchart for an image-data processing procedure according to the embodiment.

Referring to FIGS. 1 to 9, the processing procedure for the image data according to the embodiment of the invention will be described. FIG. 7 is a flowchart for the image-data processing procedure of the embodiment.

In advance of collection of image data, an operator makes an initial setting for patient information, a diagnostic region, an image-data collection mode, an image-data processing method, and an image-data display method and stores the set information in the memory circuit of the system controller 7. In this embodiment, the collection mode for B-mode image data and color Doppler image data by sector scan is set as the image-data collection mode. As the image-data processing method, the setting of filtering process for the color Doppler image data on the mean blood flow rate (or flow-rate image data) is carried out, wherein the number of pixels in the kernel data A2 and the opposite-sign determination kernel data A3, the threshold in the comparator circuit 46, and the arranging order in the pixel-value selection circuit 44, which are necessary for the filtering process, are set. (step S1 in FIG. 7).

When the initial setup is completed, the operator fixes the end (ultrasonic transmitting and receiving face) of the ultrasonic probe 1 to a specified position on the body surface of the subject and starts the collection of ultrasonic image data. In transmission of ultrasonic waves, the rate pulse generator 211 of FIG. 2 sends a rate pulse that determines the repetition period of ultrasonic pulses to be radiated into the body of the subject to the transmission delay circuit 212 in synchronization with the control signal from the system controller 7.

The transmission delay circuit 212 gives a delay time for condensing the ultrasonic waves to a specified depth to obtain a narrow beam width in transmission and a delay time for transmitting the ultrasonic waves in a first scanning direction ($\theta_1$) to the rate pulse and sends the rate pulse to the pulser 213. The pulser 213 drives the piezoelectric vibrators incorporated in the ultrasonic probe 1 to radiate ultrasonic pulses (transmission ultrasonic waves) into the subject by using piezoelectric vibrator driving pulses generated by the rate pulse.

Part of the ultrasonic pulses radiated into the subject is reflected by the boundary surface or tissue between organs with different acoustic impedances. When the ultrasonic waves are reflected by a moving reflector such as a heart wall or blood cells, the ultrasonic frequency is subjected to Doppler shift.

The ultrasonic waves (received ultrasonic waves) reflected by the tissue or blood cell of the subject are received by the piezoelectric vibrators of the ultrasonic probe 1 and converted to an electric signal (received signal). The received signal is amplified by the independent N-channel preamplifier 221 in the receiving section 22 of the transmitting and receiving section 2 and is sent to the N-channel reception delay circuit 222.

The reception delay circuit 222 gives a condensing delay time for condensing ultrasonic waves from a specified depth and a deflecting delay time for receiving signals with strong directivity in the first scanning direction ($\theta_1$) to the received signal and then sends it to the adder 223. The adder 223 adds the N-channel received signals outputted from the reception delay circuit 222 into one received signal and then applies it to the B-mode image-data generating section 31 and the Doppler-image-data generating section 32 in the image-data generating section 3.

The output signal of the adder 223 applied to the B-mode image-data generating section 31 is subjected to logarithmic conversion, envelope detection, and A/D conversion and then stored in the B-mode-image-data memory region of the image-data storage section 33.

To generate flow-rate image data, continuous multiple times (L times) of ultrasonic transmission and reception in the first scanning direction is performed in the same procedure as the above to obtain the Doppler shift of the received signal and the frequency of the resultant received signal is analyzed.

Specifically, the output signal of the adder 223 applied to the Doppler-image-data generating section 32 of FIG. 2 is subjected to quadrature detection by the mixers 323-1 and 323-2 and the LPFs 324-1 and 324-2 into a two-channel IQ signal. An I component and a Q component of the IQ signal are converted to digital signals by the A/D converters 325-1 and 325-2 and stored in the Doppler-signal memory circuit 326. Also for the received signal obtained by the L times of ultrasonic transmission and reception in the first scanning direction ($\theta_1$), an IQ signal is detected following the similar procedure and stored in the Doppler-signal memory circuit 326.

When the storage of the IQ signal obtained by L times of ultrasonic transmission and reception in the first scanning direction ($\theta_1$) in the Doppler-signal memory circuit 326 has been completed, the system controller 7 sequentially reads an I component and a Q component corresponding to a specified position (depth) from the L IQ signals stored in the Doppler-signal memory circuit 326 and applies them to the MTI filter 327. The MTI filter 327 applies temporal filtering to the L I components and Q components to exclude a tissue Doppler component (a clutter component) caused by, e.g., the motion of organs such as heart muscle, thereby extracting only a blood-flow Doppler component generated by blood flow.

The autocorrelator 328 to which the IQ signals of the blood-flow component are supplied calculates autocorrelation by using the IQ signals. The computing unit 329 calculates the mean velocity, variance, and power of the blood flow from the autocorrelation results. The same operations are performed also for IQ signals obtained from reflectors other than that at the specified position (depth). The generated flow-rate image data, variance image data, and power image data in the first scanning direction are stored in the respective memory regions of the image-data storage section 33.

The system controller 7 then transmits and receives ultrasonic waves also in a second scanning direction (θ2 direction) to an $M^{th}$ scanning direction (θM direction). The obtained B-mode image data and color Doppler image data, such as flow-rate image data, variance image data, and power image data are stored in the memory regions of the image-data storage section 33 (step S2 of FIG. 7).

When the collection and the storage of the four kinds of image data have been completed, the system controller 7 provides default data for the number of pixels in the kernel data A2 and the opposite-sign determination kernel data A3 to the kernel-data control circuit 52 of the image-data processing section 4, provides default data for the threshold value for the comparator circuit 46 and the arrangement order for the pixel-value selection circuit 44 to the control circuit 51, and applies a command signal for starting filtering of the flow-rate image data to the units in the image-data processing section 4.

The kernel-data control circuit 52 which has received the filtering start command provides information on the number of pixels in the kernel data A2 and the opposite-sign determination kernel data A3 and positional information on a first central pixel, which are inputted by the input section 6, to the kernel-data memory circuit 42 and the opposite-sign-determination kernel-data memory circuit 47.

The kernel-data memory circuit 42 extracts kernel data in a specified range (for example, 3×9 pixels) around the first central pixel from the flow-rate image data A1 stored in the image-data storage section 33 of the image-data generating section 3 and stores it.

Similarly, the opposite-sign-determination kernel-data memory circuit 47 extracts opposite-sign determination kernel data in a specified range (e.g., 3×3 pixels) around the first central pixel from the flow-rate image data A1 in the image-data storage section 33 and stores it (step S3 of FIG. 7).

Then the pixel-value arranging circuit 43 arranges 27 pixel values (flow rates) of the kernel data stored in the kernel-data memory circuit 42 in descending order (step S11 of FIG. 7). The pixel-value selection circuit 44 selects a pixel value in a predetermined rank from the array of pixel values and temporarily sets it as a filtered pixel value (step S13 of FIG. 7).

The comparator circuit 46 compares the threshold value predetermined by the input section 6 and provided via the control circuit 51 with the value of the central pixel in the kernel data A2 of the kernel-data memory circuit 42, wherein when the pixel value is larger the threshold value, a comparison result of "over the threshold value," and when the pixel value is smaller than the threshold value, "below the threshold value" is outputted to the characteristic determination circuit 49 (step S6 of FIG. 7).

The opposite-sign determination circuit 48 reads the pixel values of the opposite-sign determination kernel data A3 stored in the opposite-sign-determination kernel-data memory circuit 47 and compares the signs. When all the pixel values are plus or minus, it outputs a determination of "the same sign"; when plus pixel values and minus pixel values are mixed, it outputs a determination of "opposite sign" to the characteristic determination circuit 49 (step S7 of FIG. 7).

Then the characteristic determination circuit 49 inputs the comparison result of "below the threshold value" or "over the threshold value," which is provided from the comparator circuit 46, and the determination of "the same sign" or "opposite sign," which is provided from the opposite-sign determination circuit 48, to the table shown in FIG. 6, wherein it determines the blood-flow characteristics of the kernel data A2 and sets a pixel-value selection method suitable for the blood-flow characteristics and provides a pixel-value selection control signal according to the set pixel-value selection method to the output selection circuit 50 (step S9 of FIG. 7).

The output selection circuit 50, which has received the pixel-level selection control signal from the characteristic determination circuit 49, selects one of the pixel values temporarily set in the pixel-value selection circuit 44 and the value of the central pixel in the kernel data A2 of the kernel-data memory circuit 42 and outputs it. The outputted pixel value is stored in the color-Doppler-image-data memory region of the DSC 81 of the display section 8.

Also the other pixels in the flow-rate image data A1 are sequentially filtered following the same procedure and the processed pixel values are stored in the color-Doppler-image-data memory region. Briefly, filtered two-dimensional flow-rate image data is generated in the color-Doppler-image-data memory region of the DSC 81 (step S14 of FIG. 7).

The B-mode image data stored in the image-data storage section 33 of the image-data generating section 3 is provided directly to the display section 8, where it is stored in the B-mode-image-data memory region of the DSC 81. The DSC 81 adds color information to the flow-rate image data stored in the color-Doppler-image-data memory region and thereafter merges it with the B-mode image data to generate display image data and further converts it to a standard TV format signal and displays it on the color monitor 82 (step S15 of FIG. 7).

The kernel-data memory circuit 42 of the embodiment serves as a kernel-data generating section according to the invention, while the output selection circuit 50 of the embodiment serves as a second image-data generating section according to the invention.

Figures 8A, 8B, 8C:
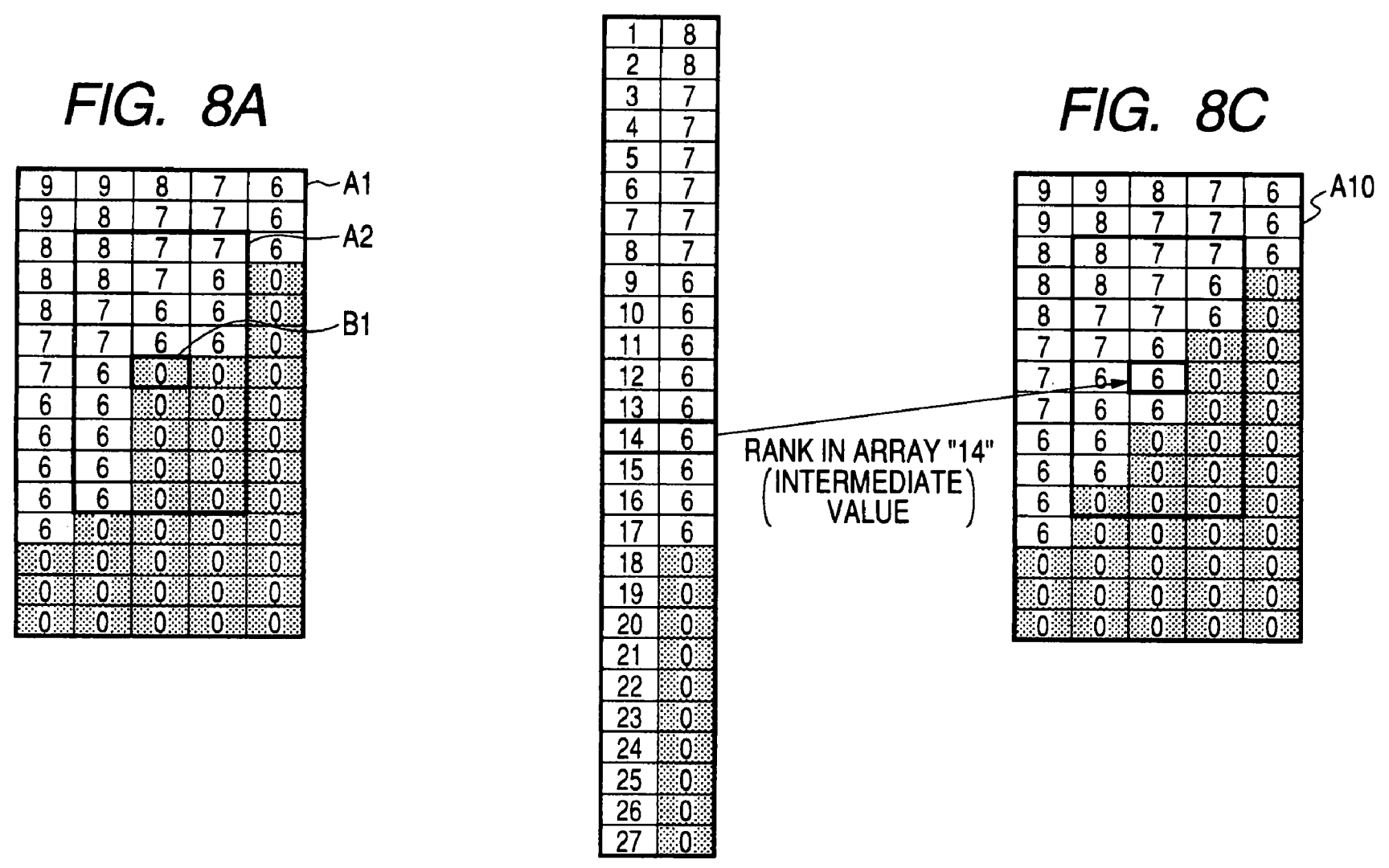

Referring to FIGS. 8A to 8C and FIGS. 9A to 9C, the effects of the filtering process of the embodiment will be described. FIGS. 8A to 8C and FIGS. 9A to 9C correspond to the group A and group C of FIG. 6, respectively, both of which assume that the boundary is not displayed smoothly. Specifically, the flow-rate image data A1 of FIG. 8A schematically shows the flow rate of blood that moves close to the ultrasonic probe 1 as +6 to +9 and a living tissue without blood flow as zero.

The kernel-data memory circuit 42 extracts kernel data A2 within a predetermined range (e.g., 3×9 pixels) with a given pixel (e.g., a pixel B1 surrounded by a bold frame) as the central pixel and stores it in flow-rate image data A1 stored in the image-data storage section 33 of the image-data generating section 3. Then the pixel-value arranging circuit 43 arranges the pixel values of the kernel data A2 in descending order, as shown in FIG. 8B. The pixel-value selection circuit 44 selects a pixel value "6" in a predetermined rank (e.g., the $14^{th}$ position (intermediate value)) from the array of pixel values and replaces the pixel value "0" of the central pixel of the kernel data A2 with the pixel value "6."

The same process (filtering process) is repeated also for the other pixels of the kernel data A2 to generate filtered flow-rate image data A10, shown in FIG. 8C. The filtering process allows the boundary between a blood vessel having blood flow and a living tissue having no blood flow to be displayed smoothly, thus providing accurate blood-flow distribution.

Figures 9A, 9B, 9C:
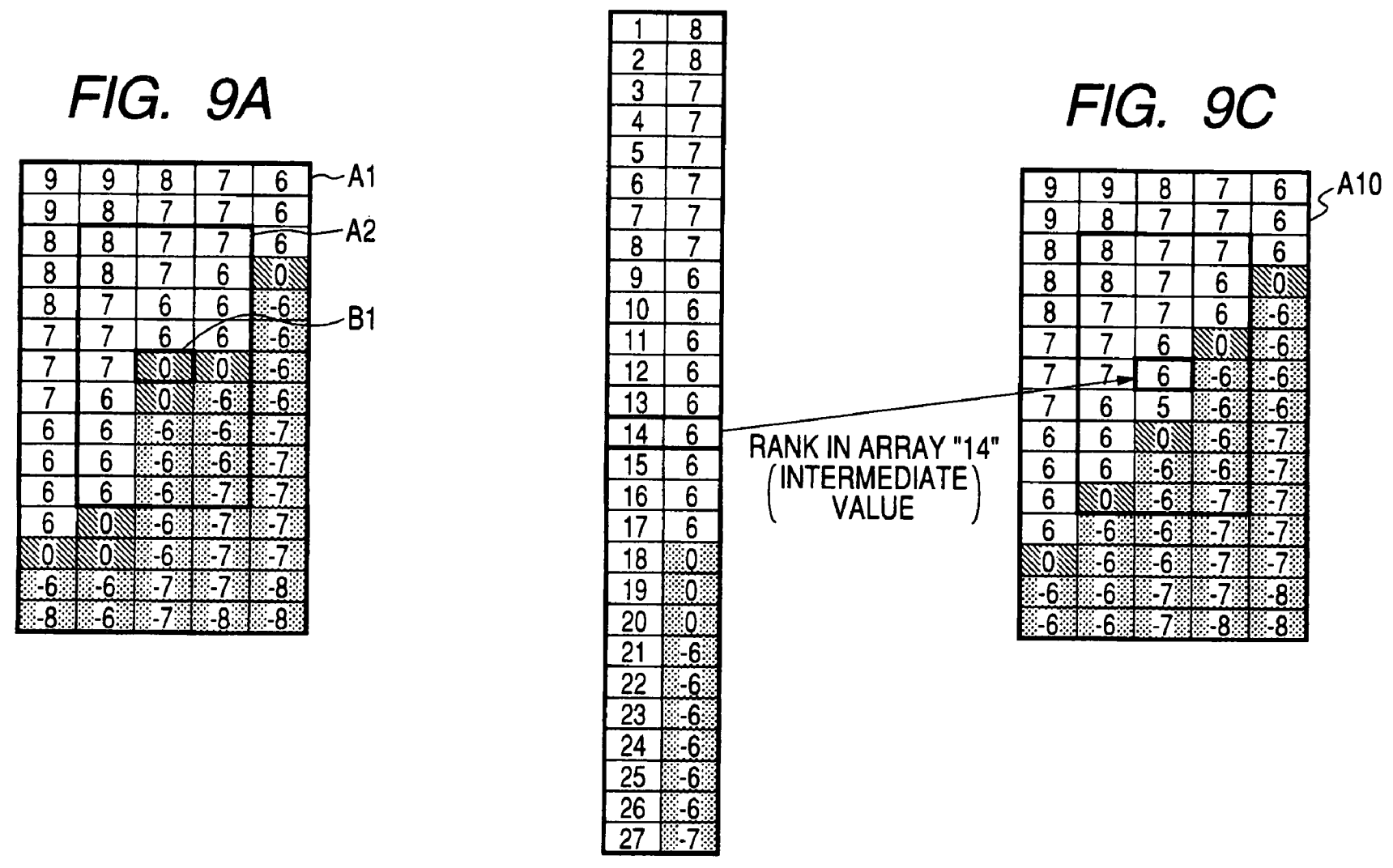

FIG. 9A shows flow-rate image data A1 composed of the flow rates (+6 to +9) of blood that moves close to the ultrasonic probe 1 and flow rates (−6 to −8) of blood that moves away from the ultrasonic probe 1. FIG. 9C shows the filtered flow-rate image data A10 generated by performing the same process (see FIG. 9B) to the flow-rate image data A1. Also in this case, the boundary of blood flowing in different directions can be displayed smoothly, as in FIG. 8.

Although the comparator circuit 46 of the embodiment compares the value of the central pixel of the kernel data A2 extracted from the flow-rate image data A1 with the predetermined threshold value, it is also possible that the comparator circuit 46 compare the value of the pixel of the variance image data or the power-value image data, which is in the same position as the central pixel, with a predetermined threshold value of the variance or power, and the characteristic determination circuit 49 set a pixel-value selection method in consideration of the comparisons.

For example, when the comparator circuit 46 determines that both of the flow rate of the central pixel of the kernel data A2 and the value (power value) of the pixel of the power-value image data, which corresponds to the central pixel, are smaller than the respective thresholds, a pixel value lower than the median is selected from the multiple pixel values (flow rates) arranged by the pixel-value arranging circuit 43 for the process of the boundary of a blood vessel. On the other hand, when both of the flow rate of the central pixel of the kernel data A2 and the value (variance) of the pixel of the variance image data, which corresponds to the central pixel, are larger than the respective thresholds, a flow rate higher than the median is selected from the multiple pixel values (flow rates) arranged by the pixel-value arranging circuit 43 for the process for turbulent flow, and the flow rate is outputted to the output selection circuit 50.

(Modification)

Referring to FIGS. 10 to 13B, a modification of the embodiment will be described. FIG. 10 is a flowchart for an image-data processing procedure according to a modification. Substantially the same processes as those of the flowchart of the embodiment of FIG. 7 will be given the same numerals and their description will be omitted.

When the filtering method of the embodiment is applied to group D of FIG. 6, the output selection circuit 50 compares the absolute value of the pixel value in a specified rank, which is selected by the pixel-value selection circuit 44, with the absolute value of the value of the central pixel of the kernel data A2, and outputs a pixel value having a larger absolute value to the display section 8. However, when a plus flow rate and a minus flow rate are generated in the kernel data A2 with almost equal frequency, small pixel values are arranged around the intermediate value of the pixel values arranged by the pixel-value arranging circuit 43. Accordingly, the output selection circuit 50 results in outputting the value of the central pixel of the kernel data A2 at all times and as such, the effects of filtering cannot be provided.

For the above problems, when it is determined that the pixel value belongs to group D (Yes in step S8 of FIG. 10), the pixel-value arranging circuit 43 modulates the pixel values of the kernel data A2 according to the flow rate of the central pixel of the kernel data A2, which is stored in the kernel-data memory circuit 42, (step S10 of FIG. 10) and arranges the modulated pixel values in descending order (step S11 of FIG. 10). The pixel-value selection circuit 44 selects a pixel value in a specified rank from the arranged modulated pixel values (step S12 of FIG. 10), demodulates the pixel value according to the value of the central pixel of the kernel data A2, and temporarily sets it as a filtered pixel value (flow rate) (step S13 of FIG. 10). Then the output selection circuit 50 generates one of the filtered pixel value temporarily set by the pixel-value selection circuit 44 and the value of the central pixel of the kernel data A2 (step S14 of FIG. 10) and outputs it to the display section 8 (step S15 of FIG. 10).

Specifically, the value of the central pixel is subtracted from the respective values of the pixels of the kernel data A2 (modulated in phase space) and the subtracted pixel values are arranged in descending order. From the arranged multiple pixel values, the value of a pixel in a specified rank is selected, to which the value of the central pixel is added (demodulated) to obtain a filtered pixel value. However, the modulation-demodulation process of the modification is not limited to the foregoing method.

Figure 11A:
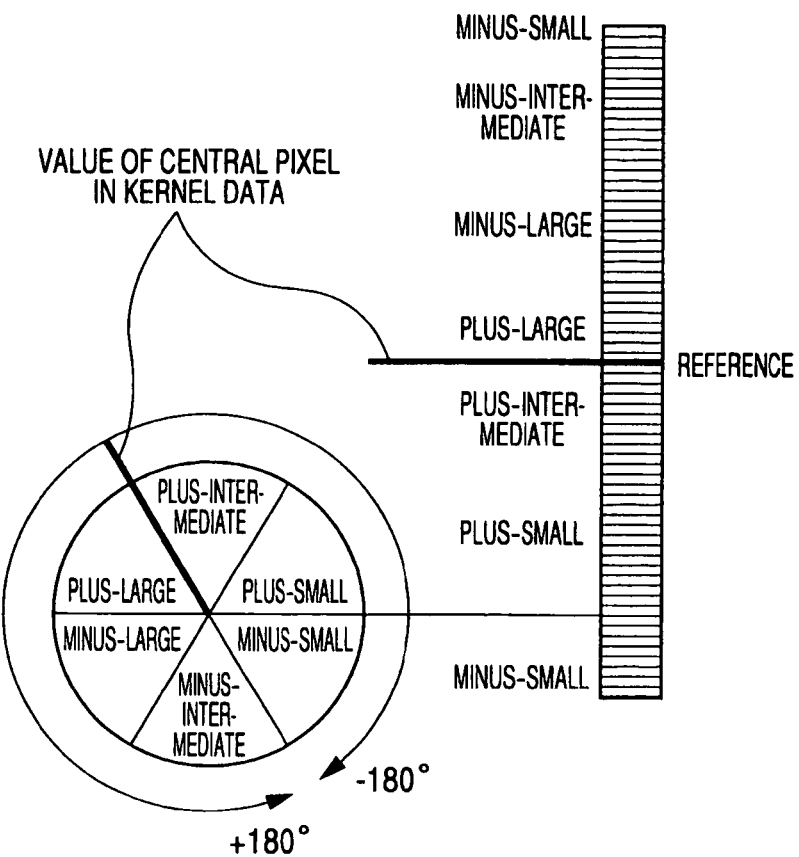
FIG. 11A is a diagram showing a method of arranging pixel values in the modification.
Figure 11B:
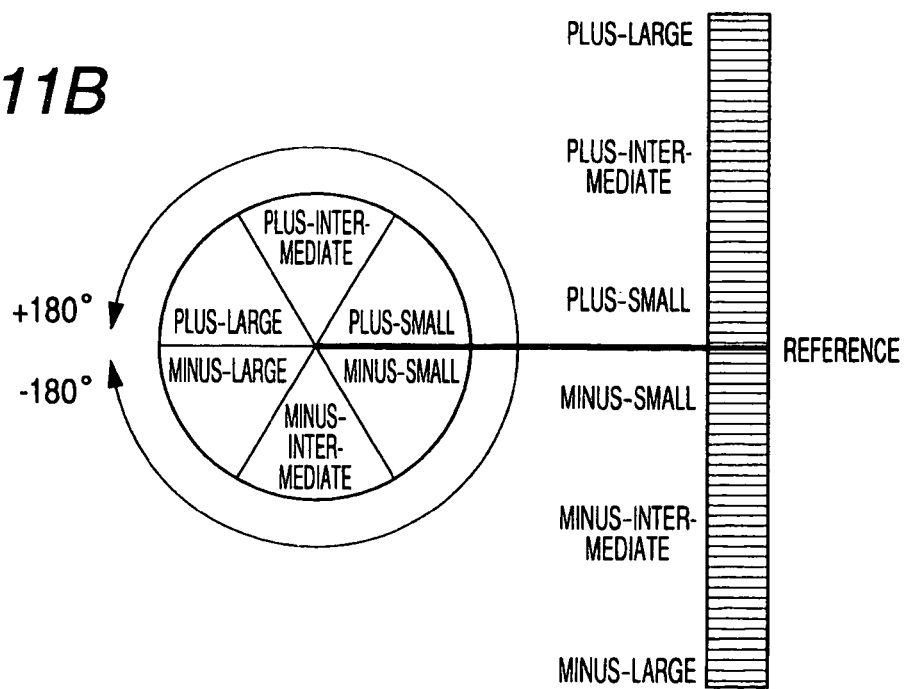
FIG. 11B is a diagram showing a method of arranging pixel values of the embodiment.

FIGS. 11A and 11B compare the method of arranging pixel values in the modification with the arranging method of the above embodiment, wherein the arrangement order of the embodiment of FIG. 11B and that of the modification of FIG. 11A are defined on a circle graph in which the phase is expressed such that the continuity of the aliasing is clearly shown. Particularly, for the modification, the other pixel values are arranged with reference to the value of the central pixel of the kernel data A2. The modulation-demodulation process according to the modification is controlled by the output signal of the characteristic determination circuit 49, which is set depending on the comparison with the threshold value by the comparator circuit 46 and the determination of the opposite-sign determination circuit 48.

In other words, the values of the pixels in the kernel data A2 are subjected to offset processing whereby the Q component of the value of the central pixel becomes zero. At that time, when the deviation in phase strides over the boundary between 180 degrees and −180 degrees, the sign of the pixel value is reversed. Thus, the pixels fall within the range of +180 to −180 degrees from the central pixel on the circle graph shown in FIG. 11A and as such, the color bar similar to that shown in FIG. 11B is given. When the offset is subtracted (demodulated) from the offset pixel values, the brightness of the image is increased to allow highlighting, as shown in the color bar of FIG. 11A.

FIGS. 12A and 12B and FIGS. 13A and 13B show the effects of the modification. FIGS. 12A and 12B show flow-rate image data A1 obtained when turning-back or backflow occurs, in which plus pixel values and minus pixel values are distributed in mosaic form. FIG. 12B shows filtered flow-rate image data A10 obtained from the output selection circuit 50, in which the kernel data A2 of 3×9 pixels surrounded by a bold frame is set in the flow-rate image data A1 and to which the filtering process of the modification is applied. Thus, the black hole pixels indicated by dashed lines disappear by the filtering method of the modification, while the mosaic pattern due to the turning-back or backflow is highlighted. In this case, the pixel-value selection circuit 44 selects the intermediate value (the 14$^{th}$ value) from the modulated multiple pixel values arranged by the pixel-value arranging circuit 43.

FIG. 13A shows an example of flow-rate image data A1 of blood flowing in the same direction, in which singular points such as a dark deflect pattern appear in the portion of the minus flow rate surrounded by a bold frame. FIG. 13B shows filtered flow-rate image data A10 to which the filtering process of this modification is applied to the flow-rate image data, in which the singular points can be extinguished. The number of the pixels in the kernel data and the arrangement order of the modulated pixel values are the same as those of FIGS. 12A and 12B.

According to the embodiment, a pixel value in a specified rank is selected from the pixel values in kernel data which are arranged in descending order, so that singular points such as a black hole pattern can be reduced without deteriorating spatial resolution and also a mosaic pattern generated by turbulent flow and a turning-back phenomenon can be highlighted. According to the modification, modulation-demodulation process is performed when a pixel value in a specified rank is selected from the pixel values of kernel data, so that the continuity in turning back can be maintained and as such, also a mosaic pattern generated with a high frequency can be highlighted.

While a preferred embodiment has been described, the invention is not limited to the foregoing embodiment but various modifications can be made. For example, although the color Doppler image data has been described for the case of flow-rate image data, it may be variance image data or power image data. Furthermore, when multiple kinds of color Doppler image data are merged and displayed as in the method of displaying and merging flow rates and variance values by brightness and hue, the filtering method according to the embodiment or the modification may be applied to at least one of the image data.

The threshold in the comparator circuit 46 and the arrangement order of the pixel values in the pixel-value selection circuit 44 may be set based on the information of the diagnostic region, the image-data collection mode, and the image-data display method.

The selection between the filtering method according to the embodiment and the filtering method according to the modification may be made by the operator whenever necessary, or alternatively, it may be made automatically according to the information on the default diagnostic region and the image-data collection mode.

While the embodiment of the invention has been described with reference to an ultrasonic diagnostic system provided with an ultrasonic probe including one-dimensional array piezoelectric vibrators and an analog receiver, the invention is not limited to the embodiment but may be an ultrasonic diagnostic system provided for an ultrasonic probe including two-dimensional array piezoelectric vibrators.

The processes of the image-data processing section 4 according to the embodiment and the modification, such as the generation of kernel data, the arrangement and selection of the pixel values, etc. may be performed independently of the ultrasonic diagnostic system by using a PC equipped with such processing functions or a computer (image processing unit) such as a workstation.

What is claimed is:

1. An ultrasonic diagnostic system, comprising:
    an ultrasonic probe including piezoelectric vibrators configured to transmit and receive ultrasonic waves to/from a subject;
    a transmitting and receiving unit configured to transmit and receive electrical signals to/from the piezoelectric vibrators;
    a first image-data generating unit configured to generate first image data from a received electrical signal obtained by the transmitting and receiving unit;
    a kernel-data generating unit configured to extract the first image data in a specified range with reference to a specified pixel of the first image data to generate kernel data;
    a pixel-value arranging unit configured to modulate the values of the pixels in the kernel data when the values of the pixels in the kernel data meet a predetermined condition and to arrange the pixel values or the modulated pixel values of at least three of the pixels in the kernel data in descending order;
    a pixel-value selecting unit configured to select a pixel value in a specified array rank from at least one of the arranged multiple pixel values and a modulated pixel value in a specified array rank from the modulated pixel values, the pixel-value selecting unit is configured to demodulate the selected modulated pixel value;
    a characteristic determination unit configured to determine a characteristic of an image from the pixel value of the first image data; and
    a second image-data generating unit configured to select a specified pixel value in the first image data and at least one of the pixel value in the specified array rank selected by the pixel-value selecting unit and the demodulated pixel value, and to generate second image data therefrom.

2. The ultrasonic diagnostic system according to claim 1, wherein the pixel-value arranging unit is further configured to modulate the values of the pixels in the kernel data such that the central pixel of the kernel data becomes zero and the signs of pixel values greater than a specified value are reversed.

3. The ultrasonic diagnostic system according to claim 1, wherein the first image-data generating unit is further configured to generate the first image data on the basis of at least one of ultrasonic physical quantities of a mean blood flow rate, variance, and power calculated from the Doppler component of the received electrical signal obtained by the transmitting and receiving unit.

4. The ultrasonic diagnostic system according to claim 1, wherein the characteristic determination unit is further configured to determine the blood-flow characteristic of the subject from the value and sign of a specified pixel in the first image data.

5. The ultrasonic diagnostic system according to claim 1, further comprising:
    a comparator unit configured to compare a value of the specified pixel in the first image data with a predetermined threshold value; and
    an opposite-sign determination unit configured to determine the signs of the pixel values in opposite-sign determination kernel data generated by extracting the first image data in a specified range with reference to the specified pixel, wherein
    the characteristic determination unit is further configured to determine the blood-flow characteristic of the subject from the comparison result of the comparator unit and the determination result of the opposite-sign determination unit.

6. The ultrasonic diagnostic system according to claim 1, further comprising:
    a display unit configured to display B-mode image data generated by the first image-data generating unit according to the received electrical signal obtained by transmitting and to receive ultrasonic waves to/from the subject and the second image data on at least one of the mean blood flow rate, variance, and power, which is generated by the second image-data generating unit, in merged form.

7. The ultrasonic diagnostic system according to claim 1, wherein the pixel-value arranging unit is further configured to arrange the modulated pixel values obtained by subtracting the value of a specified pixel in the first image data from the values of the pixels in the kernel data in descending order, and the pixel-value selecting unit is further configured to add the value of the specified pixel in the first image data to the modulated pixel value in the predetermined array rank selected from the arranged multiple modulated pixel values to demodulate the pixel value.

8. The ultrasonic diagnostic system according to claim 5, further comprising:
    input means for receiving the input setting of at least one of an extraction range of the kernel data and the opposite-sign determination kernel data, the array rank in the pixel-value selecting unit, and the threshold value in the comparator unit.

9. The ultrasonic diagnostic system according to claim 5, wherein the first image-data generating unit is further configured to generate the first image data on the basis of at least two kinds of ultrasonic physical quantities of a mean blood flow rate, variance, and power calculated from the Doppler component of the received electrical signal obtained by the transmitting and receiving unit and the comparator unit is further configured to generate the value of the specified pixel in multiple kinds of first image data with threshold values set for the at least two kinds of ultrasonic physical quantities.

10. The ultrasonic diagnostic system according to claim 8, wherein the input means receives the input of at least one of a predetermined diagnostic region, image-data collecting conditions, image-data display conditions, wherein at least one of the extraction range of the kernel data and the opposite-sign determination kernel data, the array rank in the pixel-value selecting unit, and the threshold value in the comparator unit is set by the input.

11. An ultrasonic diagnostic system, comprising:
   an ultrasonic probe including piezoelectric vibrators configured to transmit and receive ultrasonic waves to/from a subject;
   a transmitting and receiving unit configured to transmit and receive electrical signals to/from the piezoelectric vibrators;
   a first image-data generating unit configured to generate first image data from a received electrical signal obtained by the transmitting and receiving unit;
   a kernel-data generating unit configured to extract the first image data in a specified range with reference to a specified pixel of the first image data to generate kernel data;
   a pixel-value arranging unit configured to offset the values of the pixels in the kernel data by an amount to bring a Q component of the value of the central pixel in kernel data in a specified range to zero when the values of the pixels in the kernel data meet a predetermined condition and to arrange the pixel values or the obtained offset pixel values of at least three of the pixels in the kernel data in descending order;
   a pixel-value selecting unit configured to select a pixel value in a specified array rank from at least one of the arranged multiple pixel values and a modulated pixel value in a specified array rank from the offset pixel values, the pixel-value selecting unit is configured to demodulate the selected offset pixel value;
   a characteristic determination unit configured to determine a characteristic of an image from the pixel value of the first image data; and
   a second image-data generating unit configured to select a specified pixel value in the first image data and at least one of the pixel value in the specified array rank selected by the pixel-value selecting unit and the demodulated pixel value on the basis of determination of the characteristic determination unit, and to generate second image data therefrom.

12. A method of processing ultrasonic image data for an image processing system, comprising:
   transmitting and receiving, with an ultrasonic probe of the image processing system, ultrasonic waves to/from a subject to generate first image data from an electrical signal obtained from the received ultrasonic waves;
   extracting, with a kernel-data generating unit of the image processing system, the first image data in a specified range with reference to a specified pixel in the first image data and to generate kernel data therefrom;
   modulating, with a pixel-value arranging unit of the image processing system, the values of the pixels in the kernel data according to the value of the specified pixel in the first image data when the values of the pixels in the kernel data meet a predetermined condition;
   arranging, with a pixel-value arranging unit of the image processing system, the pixel values or the modulated pixel values of at least three of the pixels in the kernel data in descending order;
   selecting, with a pixel-value selecting unit of the image processing system, a pixel value in a specified array rank from the arranged multiple pixel values or modulated pixel values;
   demodulating, with the pixel-value selecting unit of the image processing system, the selected pixel value according to the value of the specified pixel in the first image data when the values of the pixels in the kernel data have been previously modulated;
   determining with a characteristic determination unit of the image processing system, the image characteristic from the pixel value in the first image data; and
   selecting, with a second image-data generating unit of the image processing system one of the values of the specified pixel in the first image data and at least one of the pixel value in the specified array rank and the demodulated pixel value selected by the pixel selecting step to generate the second image data therefrom.

13. An image processing system for performing an image filtering process of obtaining a value of a specified pixel in image data, including flow-rate information from the values of multiple pixels in a specified range, the system comprising:
   a pixel-value selecting unit configured to determine the pixel value according to the order of the values of at least three of the pixels in the specified range;
   a first determination unit configured to determine whether or not the values, indicating a flow direction of a pixel, of the multiple pixels in the specified range are the same;
   a second determination unit configured to determine whether or not the value obtained from the values of the multiple pixels in the specified range exceeds a predetermined threshold value; and
   an output unit configured to obtain a pixel value from the outputs of the pixel-value selecting unit, the first determination unit, and the second determination unit.

* * * * *